United States Patent [19]

Shirakawa

[11] Patent Number: 5,067,800
[45] Date of Patent: Nov. 26, 1991

[54] COMPOSITE OPTICAL ARTICLE AND METHOD OF MANUFACTURE THEREOF
[75] Inventor: Masaki Shirakawa, Kokubunji, Japan
[73] Assignee: Olympus Optical Company Limited, Japan
[21] Appl. No.: 535,824
[22] Filed: Jun. 11, 1990
[30] Foreign Application Priority Data
Jun. 12, 1989 [JP] Japan .................. 1-148947
[51] Int. Cl.⁵ ............................................ B29D 11/00
[52] U.S. Cl. ..................... 359/642; 359/900
[58] Field of Search ............................... 350/417, 320
[56] References Cited
U.S. PATENT DOCUMENTS
4,890,905 1/1990 Van Rosmalen et al. .......... 350/417
FOREIGN PATENT DOCUMENTS
3405789 8/1984 Fed. Rep. of Germany ...... 350/417

Primary Examiner—Bruce Y. Arnold
Assistant Examiner—Rebecca D. Gass
Attorney, Agent, or Firm—Bruce L. Adams; Van C. Wilks

[57] ABSTRACT

A composite optical article has a plastic layer of an outer diameter less than the outer diameter of a lens base member. The plastic layer is formed on the base member so as to expose an optical surface thereof and has a projecting outer periphery. Another composite optical article has a lens base member having formed therein or thereon an annular projection or groove to which an outer periphery of a plastic layer formed on the base member is bonded. The composite optical articles are manufactured by a method in which an annular projection or groove is formed on or in a plastic layer molding surface of a mold or the lens base member along an outer periphery thereof and the plastic layer is molded while filling the plastic material along the projection or groove.

18 Claims, 4 Drawing Sheets

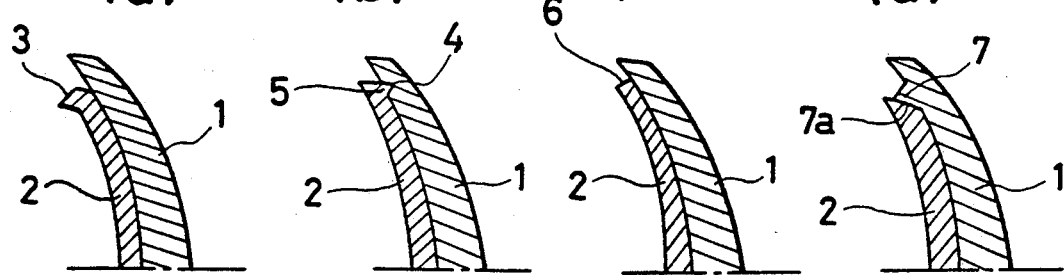
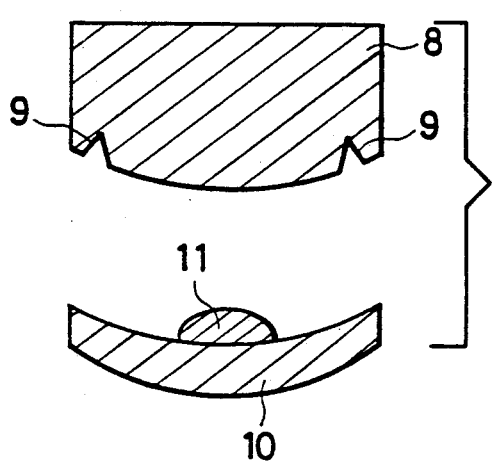
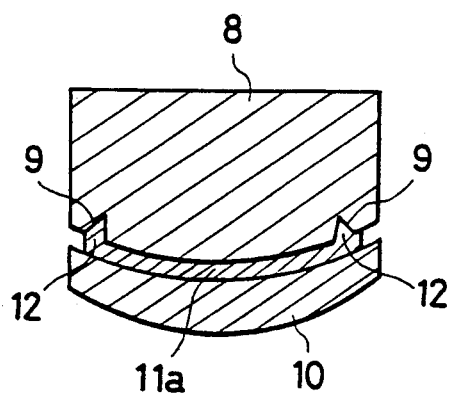
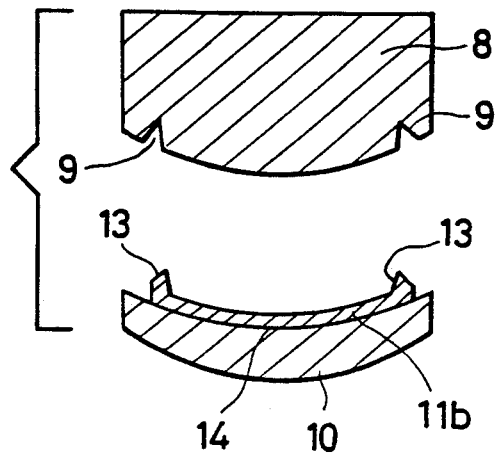

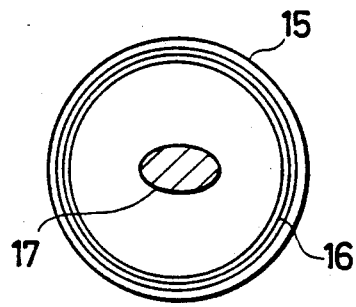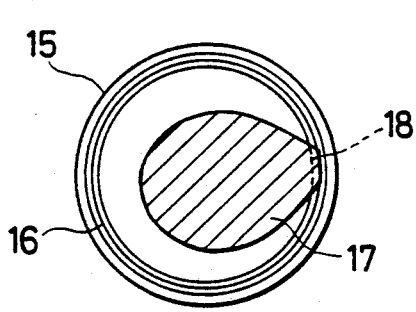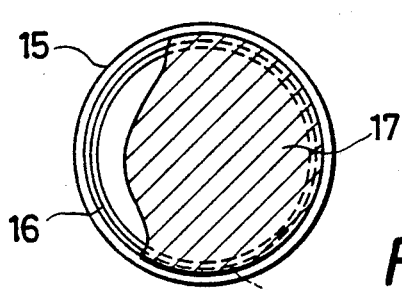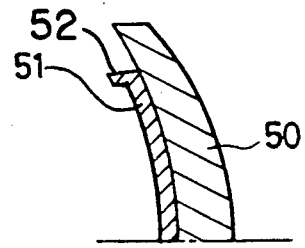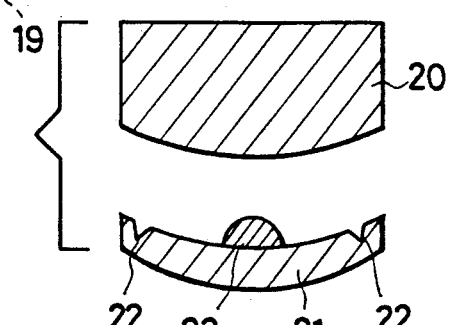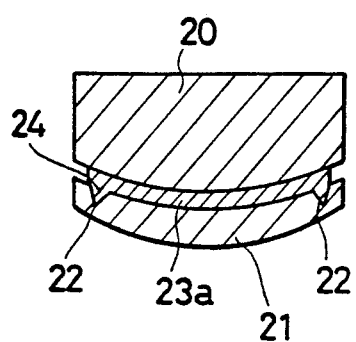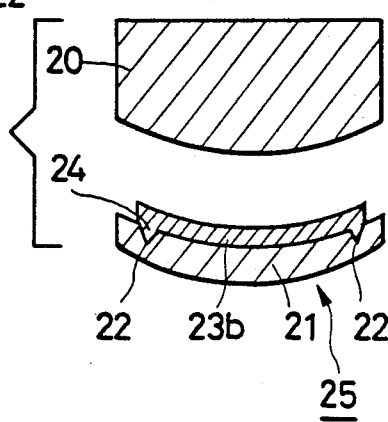

COMPOSITE OPTICAL ARTICLE AND METHOD OF MANUFACTURE THEREOF

BACKGROUND OF THE INVENTION

1. Field of the Invention

The present invention relates to a composite optical article comprising a base member of glass or a transparent plastic material and a layer of hardenable plastic material formed on a surface of the base member. The invention also relates to a method of manufacturing the composite optical article.

2. Description of the Prior Art

Many lenses, which are typical optical articles, have heretofore been formed of glass. The production cost of aspherical lenses is much higher than that of spherical lenses. In order to solve this shortcoming, a method has been proposed in which a transparent thermoplastic resin is introduced into a mold to form a plastic lens. This method eliminates the necessity for abrasion of products and, thus, is capable of mass-producing lenses at low costs. This method, however, has a disadvantage that, compared with glass, thermoplastic resin suffers from a larger shrinkage when cooled after molding, with a result that the focal length becomes out of order.

In order to eliminate this disadvantage, an improved method has been proposed in which resin is interposed between a metallic mold having a desired optical configuration and a glass base member and hardened to form a composite optical article including a plastic layer with an optical surface formed between the glass base member and the mold. Because the plastic layer is thin, this method is capable of not only assuring small thermal expansion and change of refractive index due to heat but also suppressing the occurrence of strain and thermal shrinkage void.

The conventional method of producing a composite optical article comprises the steps of:

(a) discharging a plastic material onto a plastic layer molding surface of a lens or a plastic base member;

(b) moving a mold having a desired shape towards the plastic layer molding surface to spread the discharged plastic material into a thin film-like plastic layer;

(c) allowing the plastic layer to set; and (d) removing the mold.

General composite optical articles and methods of manufacture thereof are disclosed in Japanese Unexamined Patent Publication No. 60-56544, No. 60-73816, No. 61-283511, No. 62-288030 and No. 63-110410.

In the conventional methods of producing a composite optical articles described above, if the plastic material is discharged onto the base member at a position offset from the center of the base member or if the deposit of the plastic material is of a poor true-circularity (i.e., not of a circular shape), the plastic material spread by the mold either has its center offset from the center of the base member or forms an oval shape. Accordingly, it is required that the offset of the discharged position of the plastic material and the deviation of the shape of the deposit of the discharged plastic material from the true circular shape be less than several ten $\mu$m. It is, however, difficult to assure this precision in view of the fact that a composite optical article requires the plastic material of an amount of from several ten to several hundred $mm^3$.

In addition, the plastic material tends to be nonuniformly spread due also to uneven wetness of the surfaces of the base member and the mold.

Accordingly, base members and molds of unduly large diameters have been employed so as to avoid the problems discussed above. This has resulted in the production of unduly large and expensive optical articles, each of which is inherently required to have a minimum necessary diameter to provide a necessary optical surface. The optical products incorporating the unduly large composite optical articles are also disadvantageously large-sized.

There has been another method in which an unnecessarily large amount of plastic material is deposited on a base member and then spread by a mold such that a surplus plastic material is caused to protrude out of the mold. This method, however, disadvantageously necessitates an after-treatment for wiping the protruding plastic material off the mold.

SUMMARY OF THE INVENTION

It is an object of the present invention to provide an improved composite optical article having a layer of a plastic material of a high true-circularity which can be made by the use of base member and mold both of minimum necessary diameters and without being adversely influenced by positional offset and poor true-circularity of discharged plastic material and uneven wetness of the base member and the mold, to thereby solve the problems of the prior art.

It is another object of the present invention to provide an improved method of manufacturing the improved composite optical article referred to in the preceding paragraph.

The method of manufacturing a composite optical article according to the present invention includes an embodiment in which a recess of a width of from 0.01 mm to 0.5 mm and, preferably, from 0.05 mm to 0.2 mm and a depth of from 0.05 mm to 0.5 mm, preferably from 0.05 mm to 0.2 mm, is formed in a plastic layer molding surface of a mold along the outer periphery thereof to improve the true-circularity of the plastic layer in its spread shape. The method of the present invention also includes another embodiment in which a groove similar in shape to the recess formed in the mold is formed in a plastic molding surface of a base member along the outer periphery thereof to improve the true-circularity of the plastic layer. The method further includes still another embodiment in which a projection of a width of from 0.01 mm to 0.5 mm, preferably from 0.05 mm to 0.2 mm, and a height less than the thickness of the plastic layer is formed on the plastic layer molding surface of the mold along the outer periphery thereof to improve the true-circularity of the plastic layer. The method further includes a further embodiment in which a projection similar in shape to the projection formed on the mold is formed on the plastic layer molding surface of the base member along the outer periphery thereof to improve the true-circularity of the plastic layer.

The composite optical article provided by the present invention comprises a base member having formed therein or thereon a projection or recess along the outer periphery thereof and a plastic layer having an outer periphery bonded to the base member along the projection or recess.

The projection or recess thus formed is operative to block the flow of an unevenly spread plastic material and cause the plastic material to flow along the projection or recess.

FIG. 1(a) of the drawings schematically shows a composite optical article molded by using a mold having formed therein a V-shaped groove along the outer periphery of the mold. The article comprises a base member 1 and a plastic layer 2 having a projection 3 molded along the outer periphery by the V-shaped groove in the mold.

FIG. 1(b) of the drawings schematically shows a composite optical article molded by using a base member having a V-shaped grooved formed along the outer periphery of the base member. The article comprises the base member 1 and a plastic layer 2. The base member 1 has the V-shaped groove 4 formed along the outer periphery thereof. The plastic layer 2 has its outer peripheral portion 5 filling up the V-shaped groove 4 in the base member 1 so that the plastic layer is bonded along its outer peripheral portion to the base member.

FIG. 1(c) of the drawings schematically shows a composite optical article molded by using a mold having a projection formed along the outer periphery thereof. The article comprises a base member 1 and a plastic layer 2 having an inclined outer peripheral portion 6 molded by the projection on the mold.

FIG. 1(d) of the drawings schematically shows a composite optical article molded by using a base member having a projection formed along the outer periphery thereof. The article comprises the base 1 and a plastic layer 2. The base member has a projection 7 formed along the outer periphery thereof. The plastic layer 2 has an outer peripheral portion 7a bonded to the base member along the projection 7.

The above and other objects, features and advantages of the present invention will be made more apparent by the following description with reference to the accompanying drawings.

BRIEF DESCRIPTION OF THE DRAWINGS

FIGS. 1(a) to 1(d) are fragmentary schematic sectional views of composite optical articles manufactured by the method of the present invention;

FIGS. 2(a) to 2(c) schematically illustrate a first embodiment of the method of the invention;

FIGS. 3(a) to 3(c) schematically illustrate how a deposit of a plastic material is spread;

FIG. 4 is a fragmentary schematic sectional view of a composite optical article molded by a mold similar to the mold shown in FIG. 2 but having a groove of a rectangular cross-section;

FIGS. 5(a) to 5(c) schematically illustrate a second embodiment of the method of the invention;

DESCRIPTION OF THE PREFERRED EMBODIMENTS

First Embodiment

Figure 6:
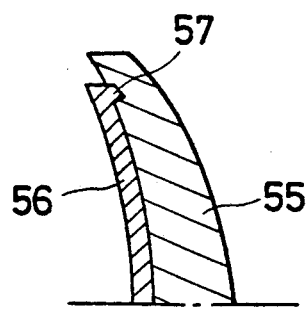
FIG. 6 is a fragmentary schematic sectional view of a composite optical article molded by a base member similar to the base member shown in FIG. 5 but having a groove of a rectangular cross-section.

Referring first to FIGS. 2(a) to 2(c) illustrating an embodiment of the method of the present invention, a metallic mold 8 has a plastic layer molding surface of a desired optical configuration having formed therein a V-shaped groove 9 along the outer periphery thereof. A base member 10 of a lens is formed of an optical glass material. A plastic material 11 of a type that is hardenable by ultraviolet rays is deposited on a surface of the base member 10, as shown in FIG. 2(a).

The deposit of the plastic material 11 on the lens base member 10 is formed by simply manually discharging the plastic material onto the base member. No control is made of the precision of the discharged position of the plastic material and of the true-circularity of the deposit of the discharged plastic material. The V-shaped groove 9 in the mold 8 has a width of 0.1 mm and an apex angle of 60° measured between the two arms of V.

As will be seen in FIG. 2(b), the mold 8 is moved towards the lens base member 10 to spread the deposit of plastic material 11 to form a plastic layer 11a and to cause a part of the plastic material to flow into the V-shaped groove 9 as at 12.

After the plastic layer 11a has been set, the mold 8 is removed from the plastic layer to obtain a composite optical article 14 which comprises the lens base member 10 and a plastic layer 11b of a desired configuration molded on the lens base member 10. The plastic layer 11b has a projection 13 formed along the outer periphery thereof, as will be seen in FIG. 2(c). The projection is formed by the plastic material molded by the V-shaped groove in the mold 8.

FIGS. 3(a) to 3(c) diagrammatically illustrate the advantage of the present invention as viewed from the side of the lens base member 10. FIG. 3(a) shows a deposit 17 of a plastic material discharged onto the glass base member and a V-shaped groove 16 formed in the mold 15. The lens base member is not shown in these figures to simplify the illustration.

FIG. 3(b) shows the state in which the mold 15 is being moved towards the lens base member. It will be seen that a part 18 of the deposit 17 of the plastic material has reached the V-shaped groove 16.

As the mold 15 is further moved from the position shown in FIG. 3(b), the deposit 17 of the plastic material is spread along the V-shaped groove 16, as indicated by reference numeral 19 in FIG. 3(c).

Table 1 below shows the results of the measurement of the shape of the plastic layer of the thus molded composite optical article 14 in comparison with the results of measurement of the shape of the plastic layer of a composite optical article produced by the conventional method.

TABLE 1

|  | A | B |
|---|---|---|
| Offset | O | X |
| True-circularity | O | X |

The column A of the above table 1 pertains to the composite optical article manufactured by the method of the present invention, while the column B of the table pertains to the composite optical article manufactured by the conventional method. The term "offset" in the table means the offset between the centers of the lens base member and the plastic layer, while the term "true-circularity" means the true-circularity of the plastic layer. The marks "O " in the table indicate the items acceptable as those of optical articles, while the mark "X" in the table indicate the items not acceptable as those of optical articles.

The composite optical articles compared in the Table 1 above were both manufactured by using an urethane acrylate-based resin of the type that is hardenable by ultraviolet rays. The mold used in the embodiment of the invention had a V-shaped groove formed along the outer periphery thereof, whereas the conventional composite optical article was manufactured by the use of a mold without such groove. The other conditions, such as the mold-releasing treatment and the coupling treatment for the glass base members, were the same. The mold-releasing treatment was conducted such that the molds used were treated with a silicone-based curing mold-releasing agent (sold under the trade name of "KS-701" by Sin'etsu Kagaku Kogyo K.K., Japan) diluted by toluene to 10 wt % solution. Then, the molds were heated to 200° C. and held at this temperature for 1 hour to cure the mold-releasing agent. The coupling treatment was conducted such that the lens base members employed were treated with a meta-acrylate-based silan coupling agent (sold under the trade name of "KBM 503" by Sin'etsu Kagaku Kogyo K.K., Japan) diluted by ethanol to 1 wt % solution. The lens base members were then subjected to aging at 80° C. for 20 minutes.

The products manufactured by the conventional method has drawbacks that the plastic layers were spread unevenly and partly projected out of the mold and partly not spread beyond the optically required diameter, that the centers of the lens base members and of the plastic layers were greatly offset and that the plastic layers had poor true-circularities. Thus, the conventionally manufactured products were not of the quality level required for the optical article. To the contrary, with the method according to the present ivnention, the deposits of the plastic material were spread to the shapes the same as that defined by the V-shaped groove in the mold. No occurrence of the offsets of centers and the poor true-circularities was observed.

The V-shaped groove of the described embodiment may alternatively be of a U-shaped or rectangular cross-section, as will be seen in FIG. 4 in which reference numeral 50 designates a lens base member, 51 denotes a plastic layer having a projection 52 of rectangular cross-section molded by a groove of a rectangular cross-section formed in the mold. In addition, the plastic layer may be molded on the convex surface of the lens base member, rather than on the concave surface.

Second Embodiment

A second embodiment of the method of the present invention will be described with reference to FIGS. 5(a) to 5(c). Reference numeral 20 denotes a mold having a desired optical configuration. Numeral 21 designates a plastic lens of a thermoplastic material molded in a mold. The plastic lens 21 has a plastic layer molding surface having formed therein a V-shaped groove 22 along the outer periphery.

The V-shaped groove 22 was formed by directly machining the plastic lens 21. The groove 22, however, may alternatively be formed by molding by means of a projection on a mold used to mold the lens 21. The V-shaped groove 22 in the plastic lens base member 21 has a width of 0.1 mm and an apex angle of 60° measured between the two arms of V. The process of manufacture of a composite optical article according to this embodiment is the same as in the first embodiment. Thus, the description will be omitted with the exception that FIG. 5(b) shows a plastic layer 23a formed by spreading a deposit 23 of plastic material shown in FIG. 5(a) and having an outer peripheral portion 24 filling up and molded by the V-shaped groove 22 in the lens base member 21 and that FIG. 5(c) shows the mold 20 removed from a plastic layer 23b of a desired shape thus molded on the plastic base member 21.

A composite optical article 25 thus manufactured by the second embodiment of the method of the invention has a plastic layer spread to the shape the same as the shape defined by the V-shaped groove in the plastic lens base member, as in the first embodiment of the invention. Occurrences of offset of the centers and poor true-circularities have not been observed.

In this embodiment of the invention, urethane acrylate-based resin of the type that is hardenable by ultraviolet rays was used. The mold-releasing treatment was conducted as in the first embodiment. The plastic lens base member used in the second embodiment was a plastic lens formed of polycarbonate. In order to improve the adherence of the plastic lens to the plastic layer, a surface of the plastic lens was subjected to a surface-improvement treatment conducted by directing ultraviolet rays of short waves to the lens surface for 60 seconds.

The V-shaped groove employed in the second embodiment may alternatively be of a U-shaped or rectangular cross-section, as will be seen in FIG. 6. In addition, the plastic layer may alternatively be molded on the convex surface of the lens base member, rather than on the concave surface.

Third Embodiment

Figure 7A:
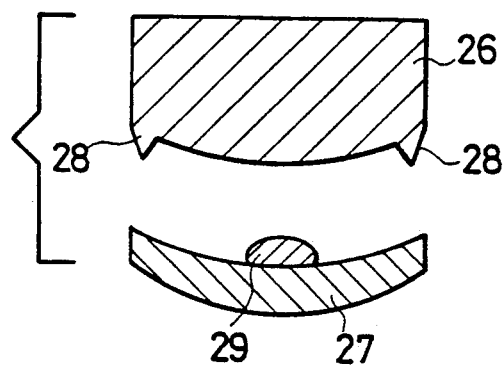
FIGS. 7(a) to 7(c) schematically illustrate a third embodiment of the method of the invention.

A third embodiment of the method of the present invention will be described with reference to FIGS. 7(a) to 7(c). Reference numeral 26 denotes a mold having a plastic layer molding surface of a desired optical configuration with a projection 28 formed along the outer periphery thereof. The projection 28 has a height of 0.2 mm and an apex angle of 60°, as best seen in FIG. 7(a).

Figure 7B:
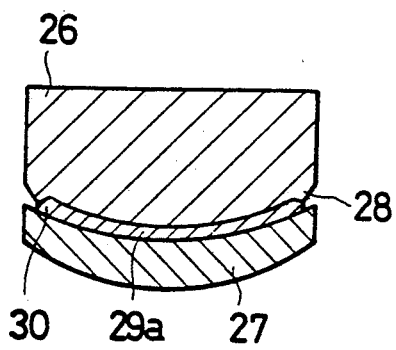
Figure 7C:
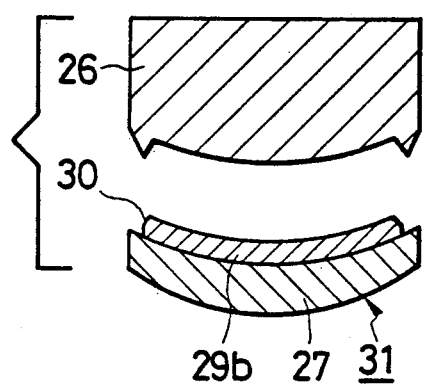

The mold 26 is moved towards a lens base member 27 with a deposit of plastic material 29 interposed therebetween until the plastic material is spread to the projection 28 on the mold 26 to form the plastic material into a plastic layer 29a having its outer periphery 30 molded by the projection 28, as will be seen in FIG. 7(b). Succeeding steps of hardening the plastic layer 29a and removing the mold 26 are the same as in the first embodiment. FIG. 7(c) shows a composite optical article 31 manufactured by the third embodiment of the method of the present invention.

The result of the examination of the plastic layer and the mold-releasing treatment and the coupling treatment are similar to those of the first embodiment.

Figure 8:
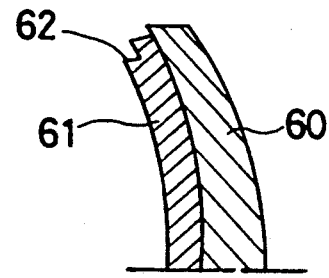
FIG. 8 is a fragmentary schematic sectional view of a composite optical article molded by a mold similar to the mold shown in FIG. 7 but having a projection of a rectangular cross-section.

The projection 28 on the mold 26 is of V-shaped cross-section which, however, may alternatively be U-shaped or rectangular cross-section, as will be seen in FIG. 8 in which reference numeral 60 denotes a base member, 61 designates a plastic layer having an outer periphery molded by a projection of a rectangular cross-section formed on a mold. In addition, the plastic layer may alternatively be molded on the concave surface of the lense base member, rather on the convex surface thereof.

Fourth Embodiment

Figure 9A:
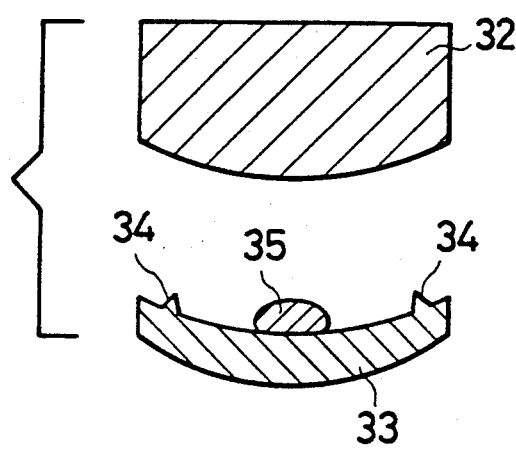
FIGS. 9(a) to 9(c) schematically illustrate a fourth embodiment of the method of the present invention.

A fourth embodiment of the method of the present invention will be described with reference to FIGS. 9(a) to 9(c). Reference numeral 32 designates a mold having a desired optical configuration. Numeral 33 denotes a plastic lens formed of a thermoplastic resin molded in a mold and having a plastic layer molding surface with a projection 34 formed along the outer periphery thereof.

The projection 34 was molded by a groove formed in the mold used for the molding of the plastic lens. The projection 34 is of a V-shaped cross-section and has a height of 0.2 mm and an apex angle of 60°.

Figure 9B:
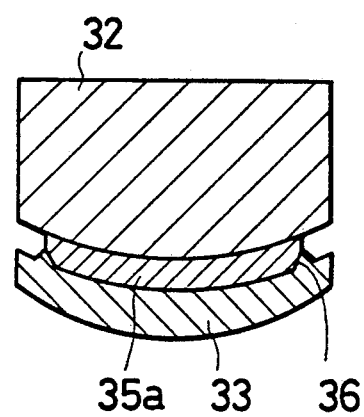

As will be seen in FIG. 9(b), the mold 32 is moved towards the base member 33 with a deposit of a plastic material 35 interposed therebetween until the plastic material is spread to form a plastic layer 35a having an outer periphery 36 molded by the projection 34 on the mold.

Succeeding steps of hardening the plastic layer 35a and removing the mold are the same as in the first embodiment.

Figure 9C:
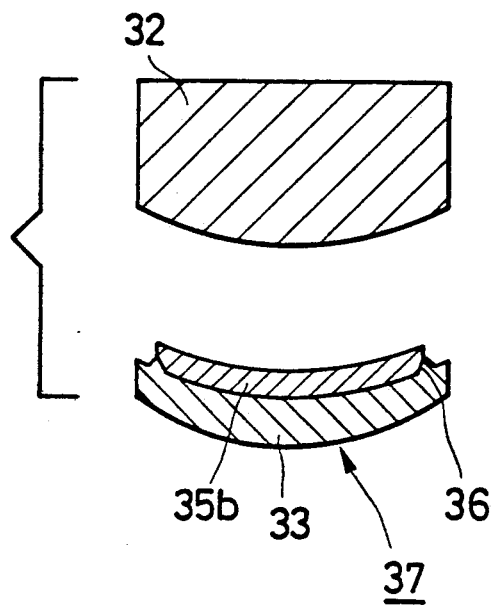

A composite optical article 37 manufactured by the fourth embodiment of the method of the invention is shown in FIG. 9(c).

The plastic material and the material of the base member used in this embodiment, the mold-releasing treatment and the surface-improvement treatment employed in this embodiment and the quality of the composite optical article manufactured by this embodiment are similar to those of the second embodiment of the invention.

Figure 10:
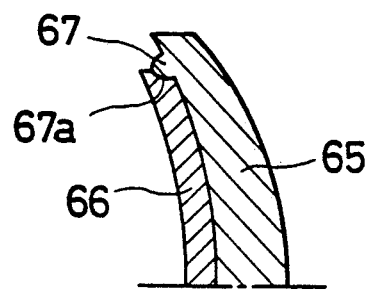
FIG. 10 is a fragmentary schematic sectional view of a composite optical article molded by a base member similar to the base member shown in FIG. 9 but having a projection of a U-shaped cross-section.

The projection of V-shaped cross-section may alternatively be of U-shaped cross-section, as will be seen in FIG. 10 which shows a composite optical article comprising a base member 65 having a projection 67 of U-shaped cross-section along which an outer periphery 67a of a plastic layer 66 is bonded to the base member. In addition, the plastic layer may alternatively be molded on the convex surface of the lens base member, rather than on the concave surface thereof.

As will be seen from the foregoing description, according to the composite optical article and the method of manufacture thereof in accordance with the present invention, the plastic layer is caused either to fill up a groove formed in the plastic layer molding surface of the mold or the base member or to reach a projection formed on the plastic layer molding surface of the mold or the base member so that the outer periphery of the plastic layer is molded by the groove or the projection. Thus, the plastic layer is spread along the groove or the projection to assure the production of a composite optical article having a plastic layer of a high true-circularity with its center not offset from that of the lense base member.

Although illustrative embodiments of the present invention have been described in detail with reference to the accompanying drawings, it is to be understood that the present invention is not limited to the described embodiments and that various changes and modifications can be made by those skilled in the art without departing from the spirit and scope of the invention which is solely defined by the claims attached hereto.

What is claimed is:

1. A composite optical article comprising; a lens base member formed of an optical glass or an optical plastic material and a plastic layer, wherein said plastic layer has an outer diameter smaller than that of said lens base member to expose an optical surface of said lens base member and said plastic layer has a projection extending from an outer peripheral edge thereof.

2. A composite optical article comprising a lens base member formed of an optical glass or an optical plastic material and a plastic layer, wherein an annular projection or groove is formed on or in said lens base member along an outer periphery thereof and an outer peripheral edge of said plastic layer is bonded to said projection or groove to mold said plastic layer.

3. A composite optical article according to claim 2, wherein said projection or groove formed along the outer periphery of said lens base member has a cross-section selected from a group consisting of inverted V-shape, inverted U-shape, rectangular shape, V-shape and U-shape.

4. A composite optical article according to claim 2, wherein said projection or groove has a width of from 0.01 mm to 0.5 mm and a height or depth of from 0.05 mm to 0.5 mm.

5. A method of manufacturing a composite optical article comprising a lens base member formed of an optical glass or an optical plastic material and a plastic layer, said method including the steps of: interposing a hardenable plastic material between a mold and said lens base member from a plastic layer on a surface of said base member, and then removing said mold, wherein an annular projection or groove is formed in or on a plastic layer molding surface of said mold or base member along an outer periphery thereof and said plastic layer is molded while filling said hardenable plastic material along said projection or groove at an outer peripheral edge of the plastic layer.

6. A method of manufacturing a composite optical article according to claim 5, wherein said projection or groove formed along the outer periphery of said lens base member has a cross-section selected from a group consisting of inverted V-shape, inverted U-shape, rectangular shape, V-shape and U-shape.

7. A method of manufacturing a composite optical article according to claim 5, wherein said projection or groove has a width of from 0.01 mm to 0.5 mm and a height or depth of from 0.05 mm to 0.5 mm.

8. A method of manufacturing a composite optical article according to claim 5, wherein said groove in said mold or lens base member has a width of 0.1 mm and an apex angle of 60°.

9. A method of manufacturing a composite optical article according to claim 5, wherein said projection on said mold or lens base member has a height of 0.2 mm and an apex angle of 60°.

10. A composite optical article comprising: a lens base member and a plastic layer having an outer diameter smaller than that of said lens base member to expose an optical surface of said lens base member, and wherein said plastic layer has an axial projection extending from an outer peripheral edge thereof.

11. A composite optical article comprising: a lens base member having an annular axial projection or groove at an outer peripheral portion thereof, and a plastic layer having an outer peripheral edge bonded to said projection or groove.

12. A composite optical article according to claim 11, wherein said projection or groove has a cross-section selected from a group consisting of inverted V-shape, inverted U-shape, rectangular shape, V-shape and U-shape.

13. A composite optical article according to claim 11, wherein said projection or groove has a width of from 0.01 mm to 0.5 mm and a height or depth of from 0.05 mm to 0.5 mm.

14. A method of manufacturing a composite optical article comprising the steps of: interposing a hardenable plastic material between a mold and a lens base member, forming a plastic layer on a surface of said base member from the plastic material, and then removing said mold, wherein an annular projection or groove is formed in or on a plastic layer molding surface of said mold or base member along an outer periphery thereof and wherein an outer peripheral edge of said plastic layer is formed while filling said hardenable plastic material along said projection or groove.

15. A method of manufacturing a composite optical article according to claim 14, wherein said projection or groove formed along the outer periphery of said lens base member has a cross-section selected from a group consisting of inverted V-shape, inverted U-shape, rectangular shape, V-shape and U-shape.

16. A method of manufacturing a composite optical article according to claim 14, wherein said projection or groove has a width of from 0.01 mm to 0.5 mm and a height or depth of from 0.05 mm to 0.5 mm.

17. A method of manufacturing a composite optical article according to claim 14, wherein said groove in said mold or lens base member has a width of 0.1 mm and an apex angle of 60°.

18. A method of manufacturing a composite optical article according to claim 14, wherein said projection on said mold or lens base member has a height of 0.2 mm and an apex angle of 60°.

* * * * *